June 22, 1965     F. B. VANDERHOOF     3,190,432
CONVEYOR SWITCHING DEVICE
Filed Aug. 29, 1963     3 Sheets-Sheet 1
FIG. 1
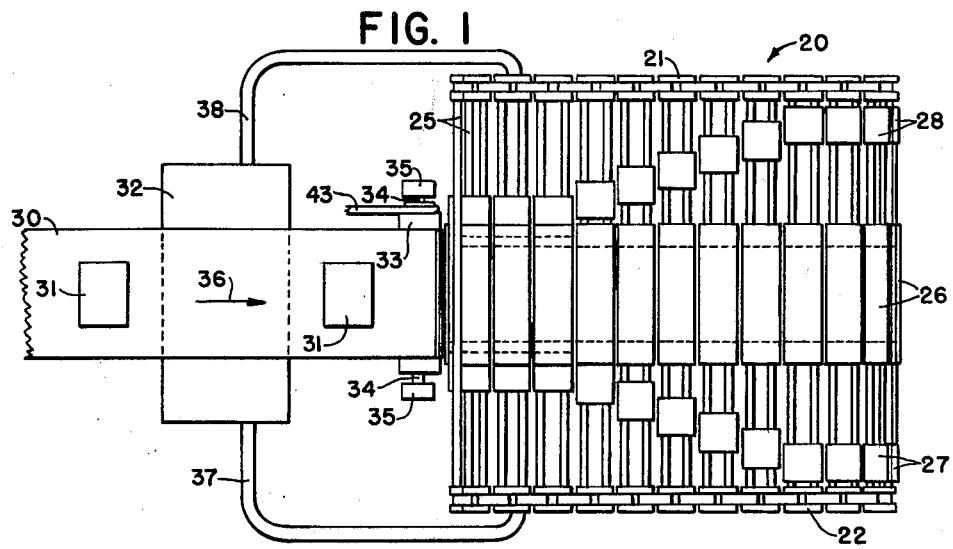
FIG. 2
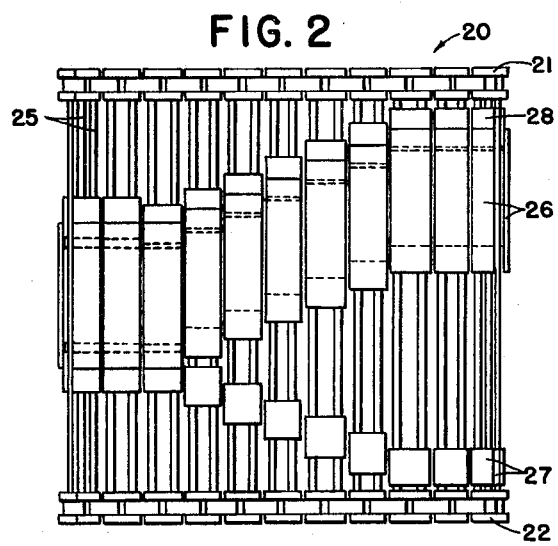
FIG. 3
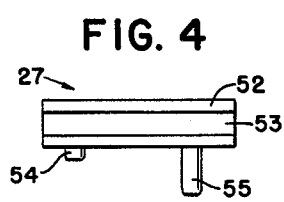
FIG. 4
FIG. 5
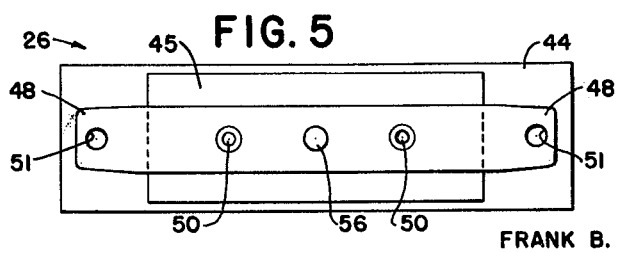
FRANK B. VANDERHOOF
INVENTOR
BY Ralph E. Bitner
ATTORNEY

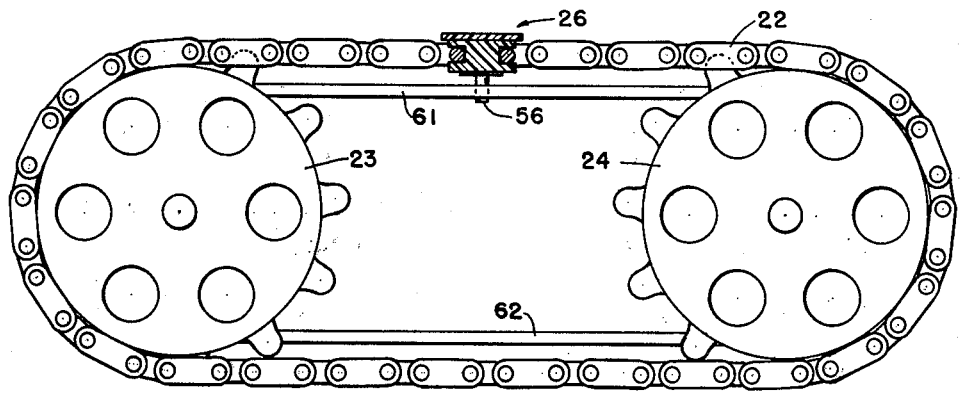
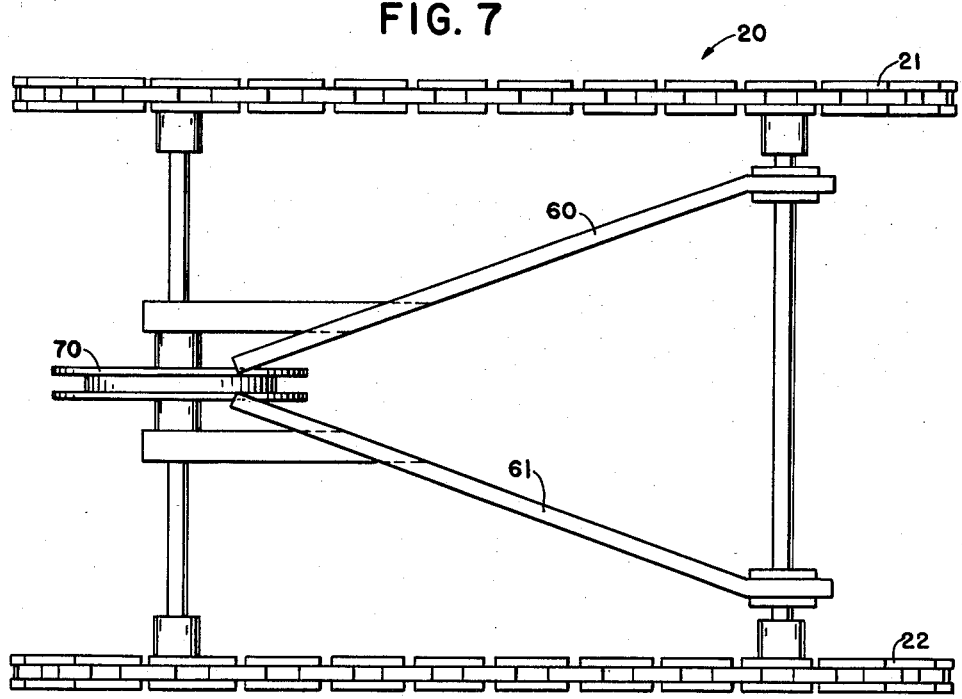
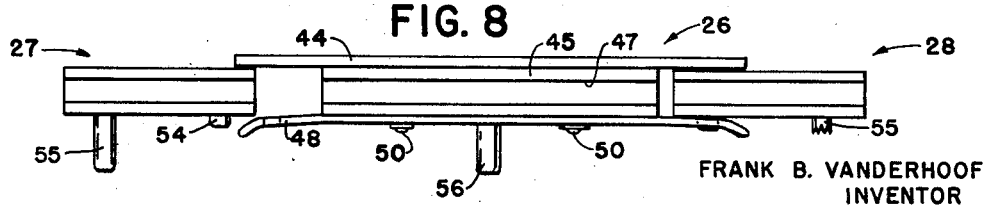

June 22, 1965 F. B. VANDERHOOF 3,190,432
CONVEYOR SWITCHING DEVICE

Filed Aug. 29, 1963 3 Sheets-Sheet 3

FRANK B. VANDERHOOF
INVENTOR

BY Ralph E. Bitner
ATTORNEY

United States Patent Office 3,190,432
Patented June 22, 1965

3,190,432
CONVEYOR SWITCHING DEVICE
Frank B. Vanderhoof, Wharton, N.J., assignor to Scale Specialties, Inc., Boonton, N.J., a corporation of New Jersey
Filed Aug. 29, 1963, Ser. No. 305,385
9 Claims. (Cl. 198—31)

This invention relates to a conveyor switching device, for switching articles received from a supply source and dividing them into two or more groups. The invention has specific relation to a switching device which is under control of a sensing system which determines into which groups the articles are to be divided. While the preferred embodiment of the invention employs a weight sensing device for dividing the articles into groups having different ranges of weights, it is obvious that any type of characteristic may be employed for group division.

Conveyor switching devices are old in the art and are now being used for receiving discrete packages and dividing them into three groups. Generally, one group is for articles having a weight which lies within a predetermined range. A second group is for all articles above the predetermined weight and the third group is for articles whose weight is below the preferred range. It has been found that all prior art switching devices are subject to certain errors, particularly those errors which result from the switching cams obstructing the cam followers or tracks which serve to guide the articles or the bases on which they are transported to the group position. The present invention is designed so that it is impossible for any one of the cam followers to strike the ends of the guiding cams and this arrangement naturally provides a reliable switching arrangement. Since these errors cannot occur in the present invention, the mechanism can be operated faster and still provide the desired results. The novel features of the invention include a series of coupling means which are coupled to carrier bases and move them to the desired group stations.

One of the objects of this invention is to provide an improved conveyor switching device which avoids one or more of the disadvantages and limitations of prior art arrangements.

Another object of the invention is to provide a reliable switching arrangement which is devoid of mechanical failure.

Another object of the invention is to prevent the cam followers from striking the ends of the switching cams.

Another object of the invention is to provide a smooth acting switching arrangement which depends only upon a coupling means between a carrier base and a switching component.

The invention comprises a conveyor switching device for separating articles into a plurality of groups. A sensing means first determines the classification of each article within predetermined ranges of values, then the articles are delivered to a plurality of carrier bases which are moved in a neutral direction when the sensing means classifies the articles within a first desired group. If the sensing means classifies the article above or below the desired group, a plurality of coupling means are coupled to the bases and move them in a direction which differs from the neutral direction so that the articles are switched to other group stations.

For a better understanding of the present invention, together with other and further objects thereof, reference is made to the following description taken in connection with the accompanying drawings.

FIG. 1 is a top view of the switching device and the sensing system, and indicates the positions of the carrier bases when the articles lie within a first predetermined range of values.

FIG. 2 is a top view of the conveyor switching device shown in FIG. 1 but showing the carrier bases in their positions when the articles are to be moved to a second group station.

FIG. 3 is a cross sectional view of one of the carrier bases showing how it is slidably mounted on conveyor rods.

FIG. 4 is a side view of one of the coupling means.

FIG. 5 is a bottom view of one of the carrier bases showing the position of the coupling spring.

FIG. 6 is a side view of the switching device showing the chain drive and sprocket wheels.

FIG. 7 is a top view of the switching device with the conveyor rods cut away in order to show the switching cams which pull the coupling means away from the central portion of the conveyor.

FIG. 8 is a side view of one of the carrier bases with a coupling means in its uncoupled position on the left side and another coupling means in its coupled position on the right side.

Figure 9:
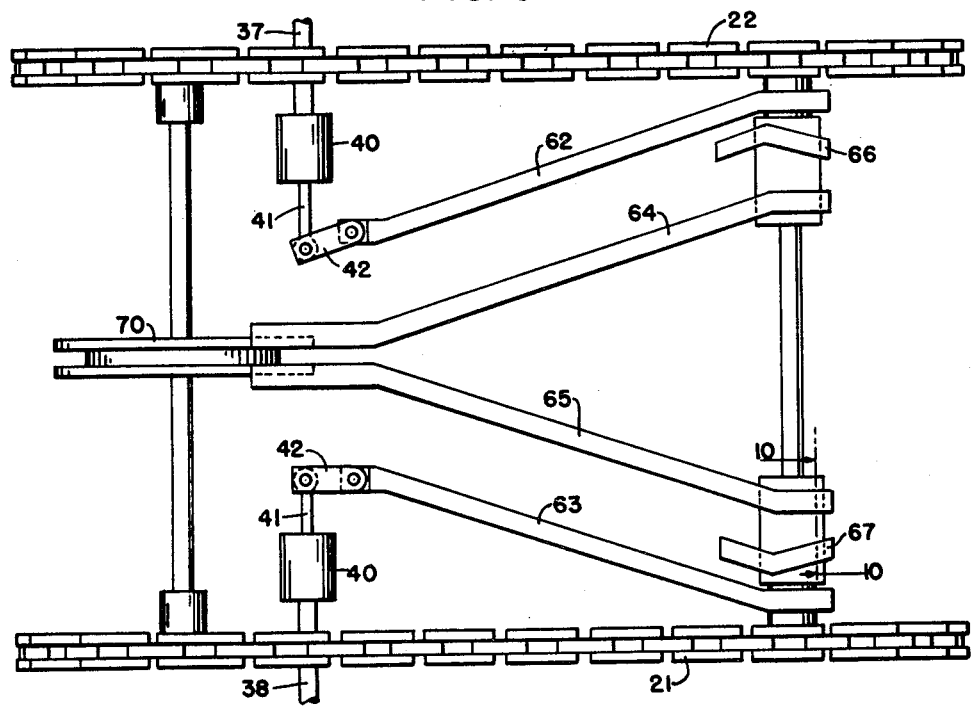
FIG. 9 is a bottom view of the conveyor switching device with the conveyor rods omitted in order to show the cams which return the carrier bases and the coupling means to their starting positions.

Referring now to FIGS. 1 and 2, the conveyor switching device includes a conveyor 20 arranged as an endless belt system and comprising two link chains 21 and 22 which mesh with two sprocket wheels 23 and 24 (FIG. 6). The links in the chain are connected to a plurality of rods 25 which are mounted transversely between the two chains and travel with the chains as they are propelled by the sprocket wheels. Each link supports a pair of transfer rods and each pair of rods supports a carrier base 26, shown in detail in FIGS. 3, 5, and 8. The rods also support a plurality of coupling means 27 on one side of the carrier bases and a similar series of coupling means 28 on the other side.

The articles to be separated are moved to the conveyor 20 by any convenient means. In FIG. 1 this means is an endless belt 30 which supports the articles 31 as they pass over a sensing means 32. Endless belt 30 is driven by a cylinder 33 supported on a shaft 34 which is journalled in supports 35. The endless belt 30 moves the articles in the direction shown by arrow 36 and deposits them on the carrier bases 26 on the left side of the conveyor. The sensing means 32 may be any type of measuring means which is adapted to classify articles 31 into any one of a plurality of ranges which have been predetermined by the adjustments of the sensing means. This portion of the system is not a part of the invention and it is understood that any type of measuring means may be employed. When the articles 31 pass over the sensing means they are graded (such as by weight) and the determination of the sensing means is applied to conduits 37 and 38 which control switching devices within the conveyor.

FIG. 9 shows one form of a switching device 40 which in this case is a hydraulic piston operating a shaft 41 and turning a short pivoted cam 42. Cylinder 33 may be run by a belt 43 and sprocket wheels 23 and 24 may be turned by any convenient power means (not shown).

Figure 10:
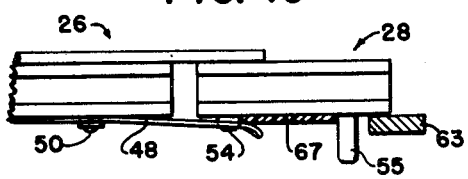
FIG. 10 is a side view of a portion of a carrier base and a coupling means with a disengaging cam shown in section and about to uncouple these two members.
Figure 11:
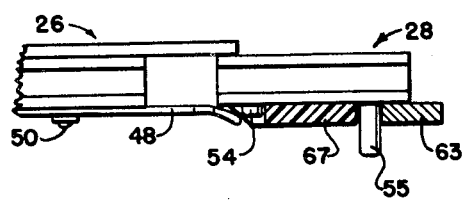
FIG. 11 is a view similar to FIG. 10 but showing the two members in their fully uncoupled positions.

The carrier bases 26 are shown in greater detail in FIGS. 3, 5, 6, and 8. In FIG. 3, a carrier base is shown mounted on a pair of rods 25 and having an upper supporting base 44 which receives articles 31 and conveys them to one of a plurality of group stations. The main body of the carrier bases is a rod 45 having channels 46 formed in each side for slidably engaging rods 25. Underneath rod 45 is a spring 48 which is secured to the rod 45 by two rivets 50. The extensions of spring 48 are provided with holes 51 which act as a coupling means to engage a portion of coupling devices 27 and 28. Other details of the carrier bases are shown in FIGS. 10 and 11.

The coupling devices 27 and 28 have a cross-sectional form similar to the carrier bases but without the spring 48. A side view of one of the coupling devices is shown in FIG. 4. This device includes a short rod 52 having channels 53 and supporting a first stub 54 and a cam follower rod 55. The channels 53 permits the slidable engagement with rods 25 in a manner similar to that of the carrier bases 26. The carrier bases are also provided with a rod cam follower 56 similar to cam follower 55. Cam followers 56 and 55 engage strip cams 60 and 61 (FIG. 7) while traveling on the upper portion of the conveyor. These strip cams always move the coupling devices 27 and 28 to the edge portions of the conveyor as shown in FIGS. 1 and 2. On the bottom portion of the conveyor arrangement (see FIG. 9) both the coupling devices 27 and 28 and the carrier bases 26 are cammed by strip cams 62 and 63 for their normal position while cams 64 and 65 push the carrier bases to their neutral position.

Figure 12:
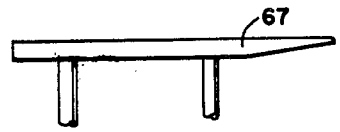
FIG. 12 is a side view of the cam which uncouples the carrier bases and the coupling means.

After the carrier bases pass the group stations where the articles are delivered to another conveyor means (not shown), the carrier bases and their coupling means are moved to the bottom portion of the conveyor where the coupling devices are uncoupled by means of wedge cams 66 and 67. The uncoupling action is illustrated in FIGS. 10, 11, and 12. In FIG. 10, the leading edge of the wedge 67 has just entered the space between the bottom portion of coupling device 28 and the end of spring 48. In FIG. 11 the spring 48 has been moved away from stub 54 and the coupling means 28 has been cammed away from the carrier base. After the carrier bases have been moved to their central position by cams 64 and 65, they are retained in this position by an idler wheel 70 which receives the lower ends of cam followers 56 and retains them in their central position while the carrier bases are moved to the upper position by the sprocket wheels.

The operation of this device is as follows: with the endless belt 30 moving in the direction shown by arrow 36, and the conveyor system moving in the same direction, articles 31 are deposited upon the upper surface of the carrier bases. In the meantime, sensing device 32, which may be a weighing scales, has determined whether or not the article is to be passed to a neutral position or is to be diverted to one of the other positions. If the sensing device 32 is a weighing means, all articles within a given range of weights are passed to the neutral position and the carriers proceed as indicated in FIG. 1. If the weight is above the predetermined range, the sensing means activates hydraulic device 40 (FIG. 9) and moves the pivoted member 42 so as to force the coupling means 28 into coupling engagement with one of the carrier bases 26. In FIG. 9, the coupling is done at the bottom portion of the conveyor system but this is not necessary since the coupling may be done at any position between that shown in FIG. 9 and the top portion of the conveyor just prior to the activation by cam 60. In FIG. 2, coupling means 28 have been coupled to the bases and cam 60 has moved eight of the carrier bases toward the upper position. If the sensing device had sensed an article that was under weight, the lower pivoted member 42 would then have coupled members 27 into engagement with the bases, the bases and the article would then have moved toward a power position as indicated in FIG. 2.

The spring coupling means shown in the drawings and described above is only one means of coupling the carrier bases to move them out of their neutral position. For many applications, a spring detent can be used. This coupling means includes a spring similar to spring 48 except that the end portions are bent to form a V detent which fits into a similar shaped slot formed in the bottom of member 27. The coupling members are joined to the carrier bases in the usual manner. After the switching operation, the coupled members are simply cammed apart without the necessity of lifting a spring above a stud.

It is obvious from the above description that none of the cam followers 55 or 56 can be manipulated so that they will get in front of the cams 60 and 61 which move the coupling means or the cams 62 to 65 which return the coupling means and the carrier bases to their original starting positions. There are many ways in which the actuating devices 40 can be operated so as to insure that only is operated at any one time. The result is that the switching device will always operate to switch articles carried by it to either one of three positions.

While the above description and the drawings show only three group stations it is obvious that many more switching stations may be used by following the principles of the invention outlined above. It is also possible to use several of these devices in series arrangement. The first switching device can be employed to divide the articles into three groups as described. Then each of these three groups can be transferred to other sensing stations where they may be again switched into other groups.

The foregoing disclosure and drawings are merely illustrative of the principles of this invention and are not to be interpreted in a limiting sense. The only limitations are to be determined from the scope of the appended claims.

I claim:

1. A conveyor switching device for separating received articles into a plurality of groups, a sensing means for determining the classification of an article within a predetermined range of values, a plurality of carrier bases propelled by a power means to receive the articles from a supply source, said bases movable in a neutral direction when the sensing means classifies the articles within a first predetermined range of values, a plurality of control coupling means mounted adjacent to the bases, said coupling means adapted to be coupled to the bases whenever the sensing means classifies an article outside said predetermined range of values, said coupling means also controlled by a cam follower and cam to move in a direction which differs from said neutral direction.

2. A conveyor switching device for separating received articles into a plurality of groups, a sensing means for determining the classification of an article within a predetermined range of values, a plurality of carrier bases propelled by a power means to receive the articles from a supply source and to deliver each of them to one of a plurality of separate group stations, said bases movable in a neutral direction when the sensing means classifies the articles within a first predetermined range of values to transfer articles carried by the bases to a first group station, a plurality of control coupling means normally uncoupled but adapted to be coupled to a base whenever the sensing means classifies an article above or below said predetermined range of values, at least one of said coupling devices positioned adjacent to each carrier base, said coupling means controlled by a cam follower and a cam to move each coupling means and its coupled carrier base in a direction which differs from the neutral direction to transfer articles carried by said bases to a second group station.

3. A conveyor switching device for separating received articles into three groups, a sensing means for determining the classification of an article within three predetermined ranges of values, a plurality of carrier bases adapted to receive articles from a supply source, a power means for moving said bases in a generally neutral direction toward a first group station, a first series of coupling means mounted adjacent to one side of the bases for selectively moving the bases toward a second group station, a second series of coupling means mounted adjacent to the other side of the bases for selectively moving the bases toward a third group station, all of said coupling means controlled by the sensing means for selectively coupling the bases to the coupling means in accordance with the group selection, said coupling means also controlled by cams and cam followers to move said first series in a first direction which differs from the neutral direction and to move said second series in a second direction which also differs from the neutral direction.

4. A conveyor switching device for separating received articles into a plurality of groups comprising, an endless belt arrangement which includes two link chains each meshed with two sprocket wheels and a plurality of spaced rods connecting links in each chain, the top of said arrangement confined so as to move through a horizontal plane while carrying articles from a source of supply to a plurality of group stations, a power means for rotating the sprocket wheels and for moving the rods through the plane, a plurality of carrier bases mounted on the rods for supporting said articles during a switching operation and for moving the articles toward a neutral group station, said bases slidably movable along the rods to one of a plurality of other group stations, a plurality of normally uncoupled coupling means also slidably mounted on said rods, half of the coupling means respectively mounted adjacent to one side of the bases and the other half mounted adjacent to the other side, all of said coupling means controlled by a sensing means to remain in an uncoupled position when the sensing means classifies an article within a predetermined range of values, and to be coupled to the adjacent carrier bases when the sensing means classifies an article within a range of values above or below said predetermined range, each of said coupling means also controlled by a cam and a cam follower to move in a direction which differs from the direction taken by the uncoupled bases.

5. A conveyor switching device as claimed in claim 4 wherein said coupling means are uncoupled by a wedge cam after the articles have been delivered to the group stations.

6. A conveyor switching device as claimed in claim 4 wherein said coupling means are controlled by the cam and cam follower to move away from the uncoupled carrier bases while moving toward said neutral station in said horizontal plane, with additional cam means for moving the carrier bases and the coupling means to their normal central positions.

7. A conveyor switching device as claimed in claim 4 wherein said carrier bases are each formed with transverse channels which slidably engage said rods and are supported by them.

8. A conveyor switching device as claimed in claim 7 wherein said coupling means are also formed with two transverse channels which slidably engage said rods and are supported by them.

9. A conveyor switching device as claimed in claim 7 wherein said cam follower on the coupling means is an outwardly extending rod and wherein said cams are horizontal metal strips mounted at an angle to said neutral direction.

References Cited by the Examiner
UNITED STATES PATENTS 3,031,078  4/62  Seaborn.
3,093,245  6/63  Worcester et al.
3,129,803  4/64  Giulie et al.

SAMUEL F. COLEMAN, *Primary Examiner.*